US006834191B2

(12) United States Patent
Wallentin et al.

(10) Patent No.: US 6,834,191 B2
(45) Date of Patent: *Dec. 21, 2004

(54) MULTICELL AREA PAGING FOR CELLULAR TELECOMMUNICATIONS SYSTEM

(75) Inventors: Pontus Wallentin, Ljungsbro (SE); Håkan Palm, Lund (SE); Mikael Nordman, Kyrkslätt (FI); Per Hans Ake Willars, Stockholm (SE); Göran Christersson Rune, Linköping (SE); Johan Rune Lagneborg, Alvsjo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 79 days.

This patent is subject to a terminal disclaimer.

(21) Appl. No.: 09/953,261

(22) Filed: Sep. 17, 2001

(65) Prior Publication Data

US 2002/0086685 A1 Jul. 4, 2002

Related U.S. Application Data

(63) Continuation of application No. 09/071,886, filed on May 5, 1998, now Pat. No. 6,292,667.

(51) Int. Cl.[7] .............................................. H04Q 7/22
(52) U.S. Cl. ....................................... 455/442; 370/331
(58) Field of Search .......................... 455/422.1, 435.1, 455/436, 442, 458; 370/331

(56) References Cited

U.S. PATENT DOCUMENTS 5,381,464 A   1/1995  O'Keefe et al.
5,475,689 A * 12/1995  Kay ........................... 370/95.3

(List continued on next page.)

FOREIGN PATENT DOCUMENTS

WO   95/15665    6/1995
WO   97/49259   12/1997

OTHER PUBLICATIONS

Pacific Digital Cellular standard for inter–MSC paging, appearing in document TTC JJ–70.10, chapter 3.3.1.2 (1995), pp. 92–95.

(List continued on next page.)

*Primary Examiner*—Nick Corsaro
(74) *Attorney, Agent, or Firm*—Nixon & Vanderhye, P.C.

(57) ABSTRACT

A radio access network portion of a telecommunications network (18) which serves a mobile station (MS) is connecting to a core network. The radio access network portion has plural base stations (BS) serving respective plural cells (C), as well as plural control nodes (RNCs). The control nodes include a first control node (RNC1) for controlling a first group of the plural base stations and a second control node (RNC2) for controlling a second group of the plural base stations. A multicell area (MCA) includes cells served by at least some of the first group of base stations and cells served by at least some of the second group of base stations. The radio access network portion of a telecommunications network further has a paging control node which stores information regarding the multicell area. To page the mobile station in the multicell area, the paging control node (1) sends paging messages to each of the base stations serving the multicell area controlled by the paging control node: and (2) sends a paging message to any other control nodes which control base stations serving cells in the multicell area. The paging control node determines to which base stations and other control node(s) it should send paging messages by consulting a paging table (100). Preferably the paging control node is one of the control nodes of the radio access network. The paging control node is connected to the other control node(s) by an inter-control node link (32) over which the paging message is sent.

45 Claims, 11 Drawing Sheets

U.S. PATENT DOCUMENTS

| | | | |
|---|---|---|---|
| 5,613,199 A | | 3/1997 | Yahagi |
| 5,640,677 A | * | 6/1997 | Karlsson .................... 455/33.2 |
| 5,640,678 A | * | 6/1997 | Ishikawa ................... 455/33.2 |
| 5,732,357 A | * | 3/1998 | Gayton ...................... 455/503 |
| 5,734,984 A | * | 3/1998 | Reece ........................ 455/458 |
| 5,787,349 A | * | 7/1998 | Taketsugu .................. 455/445 |
| 5,832,382 A | * | 11/1998 | Alperovich ................. 455/433 |
| 5,845,211 A | * | 12/1998 | Roach ........................ 455/436 |
| 5,901,142 A | * | 5/1999 | Averbuch et al. ........... 370/329 |
| 6,119,000 A | * | 9/2000 | Stephenson et al. ..... 455/432.1 |
| 6,292,667 B1 | * | 9/2001 | Wallentin et al. ........... 455/458 |

OTHER PUBLICATIONS

GSM 09.02 version 5.6.0, Chapter 6.2, Paging and Searching; Draft pr ETS 300 974, Aug. 1997, pp. 82–84.

GSM 03.60, GPRS Service Description, Chapter 6.3, Interactions Between SGSN and MSC/VLR, 1997, pp. 29–32.

U.S. patent application Ser. No. 09/035,788, filed Mar. 6, 1998, entitled "Telecommunications Inter–exchange Congestion Control".

U.S. patent application Ser. No. 09/035,821, filed Mar. 6, 1998, entitled "Telecommunications Inter–exchange Measurement Transfer".

U.S. patent application Ser. No. 08/916,285, filed Aug. 22, 1997, entitled "Geographical Restriction In Cellular Telecommunications Network".

* cited by examiner

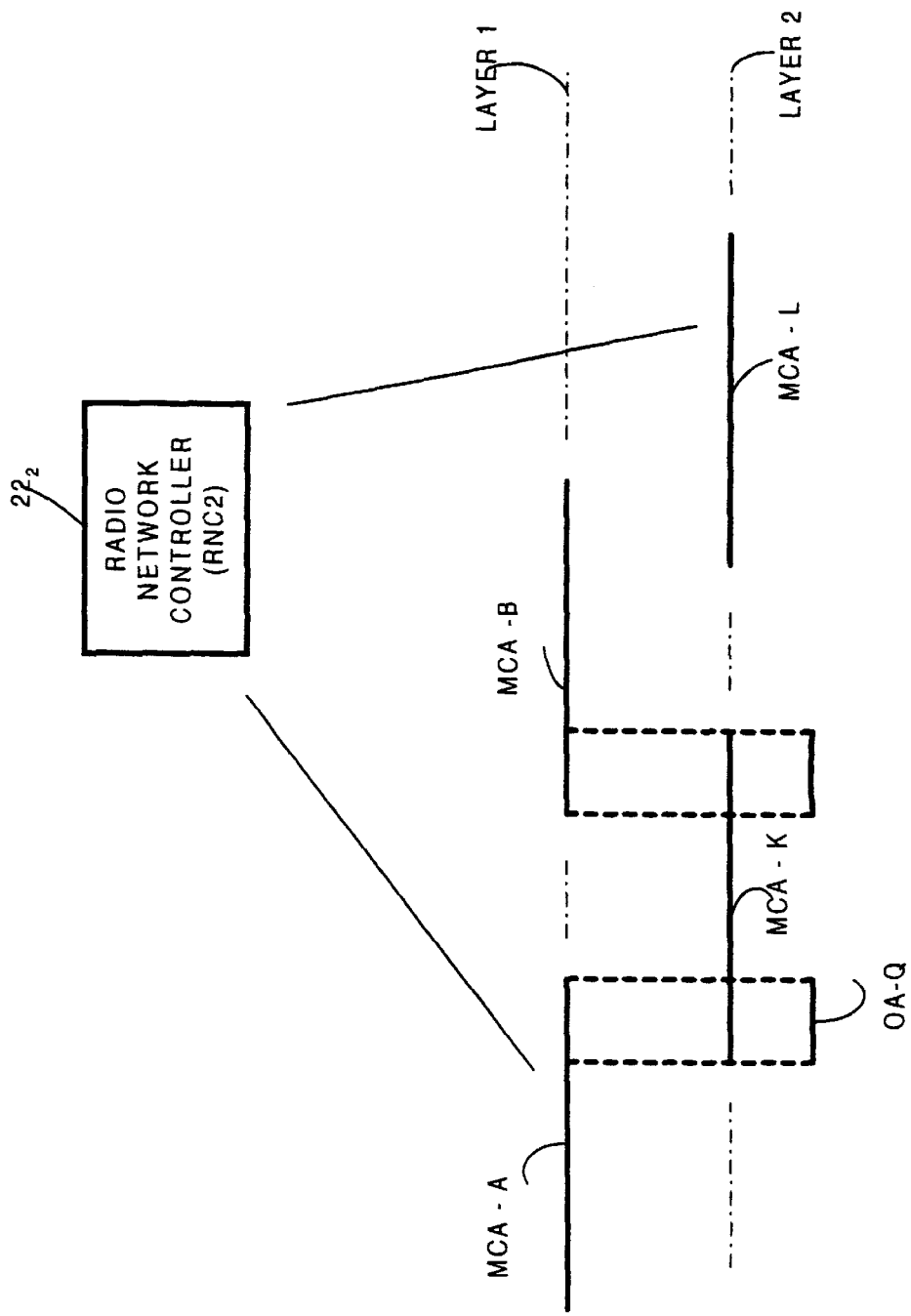

MULTICELL AREA PAGING FOR CELLULAR TELECOMMUNICATIONS SYSTEM

This is a continuation of application Ser. No. 09/071,886, filed May 5, 1998, now U.S. Pat. No. 6,292,667.

This patent application is related to U.S. patent application Ser. No. 09/035,788 filed Mar. 6, 1998 and entitled "Telecommunications Inter-Exchange Congestion Control"; U.S. patent application Ser. No. 09/035,821 filed Mar. 6, 1998 and entitled "Telecommunications Inter-Exchange Measurement Transfer"; and U.S. patent application Ser. No. 09/036,391, filed Mar. 6, 1998 and entitled "System and Method used in a Mobile Telecommunications Network for Load Balancing Ongoing Calls between Different Base Station", all of which are incorporated herein by reference.

BACKGROUND

1. Field of the Invention

The present invention pertains to telecommunications, and particularly to paging of a mobile station within a cellular telecommunications system.

2. Related Art and other Considerations

In recent years cellular telephones have become increasingly popular. A cellular telephone is just one example of what is referred to in telephone parlance as a "mobile station" or "mobile terminal". Telecommunications services are provided between a cellular telecommunications network and a mobile station (e.g. cellular telephone) over an air interface, e.g. over radio frequencies. At any moment an active mobile station is communicating over the air interface with one or more base stations. The base stations are, in turn, managed by base station controllers (BSCs), which in some systems are also known as radio network controllers (RNCs). The radio network controllers are connected via control nodes to a core telecommunications network. Examples of control nodes include a mobile switching center (MSC) node for connecting to connection-oriented, circuit switched networks such as PSTN and/or ISDN, and a general packet radio service (e.g., GPRS) node for connecting to packet-switched networks such as Internet, for example.

The radio transmissions of each base station cover a particular geographical area. As used herein, the geographical area into which radio transmissions of a base station extend is termed a "cell". Such definition of "cell" thus encompasses systems in which the perspective is such that a base station covers a single cell, as well as systems wherein the term "cell" is differently employed in a manner such that a base station serves more than one cell. Regardless of perspective, a handoff or handover must occur as a mobile station travels from an old cell to a new cell (e.g., for example when the mobile travels into a cell covered by different base stations and or different RNCs). This permits mobile stations to "roam" considerable distances.

In view of the extent to which a mobile station can travel, location management of a mobile telecommunications system can be extensive. A number of geographical area levels can be utilized. In this regard, cells can be grouped into larger areas, for example into location areas. A location area can be served by plural radio network controllers (RNCs). Location areas are discussed, for example, in U.S. patent application Ser. No. 08/916.285, filed Aug. 22, 1997, entitled "GEOGRAPHICAL RESTRICTION IN CELLULAR TELECOMMUNICATIONS NETWORK", which is incorporated herein by reference. In view e.g., of the potential complexity of such location management schemes, an effort is made to keep track of the location of the mobile station while trying to minimize the radio resources devoted to such effort.

One method for saving radio resources involves location updating messaging. In location updating, when a mobile station which is idle (i.e., there is no current connection between the mobile station and the network) moves into a cell belonging to a new location area, the mobile station apprises of its whereabouts by sending a message known as a location update. The location update message must be sent so that both a home location register (HLR) maintained for the mobile station and a visitor location register (VLR) have appropriate current information about the mobile station and its whereabouts. Then, when the network needs to establish a connection or exchange data with the mobile station, the mobile station is paged within the last location area apprised by the mobile station. The mobile station answers the page by sending a page response message to the network from the cell where the mobile station is currently located.

As indicated above, the aforementioned location updating is utilized when the mobile station is idle (e.g., is not participating in an on-going call). Moreover, when the mobile station is idle the location updating is applicable not only to circuit switched services (which can involve speech services and/or data services), but also to packet switched services as well. Whereas in circuit switched services the data user has radio resources continuously reserved for the connection to the radio network during a data call (e.g., even when not transferring data), in packet switched services the user has radio resources reserved for the connection to the radio network only when either (1) the mobile station desires to transmit or (2) the network has something to transmit to the mobile station. In other words, in the packet switched service the mobile station (e.g., a computer with mobile termination) does not have radio resources reserved for the connection to the network constantly while the computer is in use, but only during these two transmission events. One example of packet switched service recently available within the GSM (Global System for Mobile communications) system is General Packet Radio Service (GPRS).

When a mobile station is connected with the network during a connection involving a packet-switching service, procedures such as cell updating and routing area updating are employed. When the mobile station moves into a new cell, it updates the network with its location on a cell level. However, in periods of no data transfer, cell updating wastes radio resources. Instead routing area updating is used in periods of no data transfer. Thus, the routing area updating typically occurs only during the lifetime of the packet-switched connection. A routing area is a group of cells. The routing area is typically smaller than a location area. Since traffic for a packet switched service is very bursty in nature with long periods of no packet transfer, it would be a waste of radio resources to have a radio channel continuously assigned to a connection. Instead, when the mobile station moves into a new routing area, the mobile station updates the network with its current location, e.g., with its current routing area, similar to the location area update described above. When a packet is to be sent from the network to the mobile station, and when the location of the mobile station is known only at the routing area level, a paging message is sent in all cells belonging to the routing area where the mobile made its last routing area update.

Location areas and routing areas, although generally having differing purposes, are hereinafter referred to as multicell areas. A cell can be included in more than one multicell area. Two or more multicell areas that contain such a cell are said to be "overlapping". The use of overlapping multicell areas can limit the "ping-pong" effect at borders between exchanges (e.g., as between mobile switching centers (MSCs). The ping-pong effect occurs when a mobile station repeatedly crosses between two cells which belong to different multicell areas. When the ping-pong effect is present, the mobile station must update its multicell area with each such crossing. Moreover, ping-pong effects generate much undesirable additional signaling within the network, e.g., between MSCs.

In current cellular telecommunications systems, distribution of paging is handled in a truly hierarchial manner. In this regard, an MSC distributes a page to all RNCs that control cells within the area where the mobile station is to be paged (e.g. a location area or a routing area). The RNCs then send each page request to all base stations transmitting and receiving radio signals which (1) are controlled by the RNC; and (2) are located within the area where the mobile station is to be paged (e.g., a location area or a routing area). The base stations then send the actual paging signal over the air interface.

Certain paging procedures are accommodated within the GSM (Global System for Mobile communications). For example, GSM 09.02 Version 5.8.0, February 1998, GSM MAP specification, Chapters 6.2.1–6.2.2, Paging and Search, cater to the possibility for a VLR to request paging from an MSC. As ascertained from this specification, the VLR knows the location area where the mobile station is supposedly located, and forms paging signals which are to be sent to the BSCs. However, the MSC and the VLR have a one-to-one relationship; i.e., there is one VLR for each MSC. The MSC and VLR are also two differing node types, representing differing functionality types.

GSM also allows for a Serving GPRS Support Node (SGSN) to receive a paging request from the MSC/VLR. An SGSN is a type of MSC handling only packet switched services, and has a different functionality than the MSC/VLR. In the SGSN, the routing area where the mobile station is located is stored in case the mobile station is attached to the GPRS service (mentioned above). See GSM 03.60, GPRS Service Description, Chapter 6.3, Interactions Between SGSN and MSC/VLR.

In the Pacific Digital Cellular standard for inter-MSC paging, appearing in document TTC JJ-70.10 chapter 3.3.1.2 (1995), paging distribution is accomplished by an anchor mobile switching center (AMSC) from which the terminating call was routed to other MSCs. Thus, this standard involves the core network in paging distribution (being at the MSC level), and requires that the core network have knowledge of the cell topology.

It may, in some instances, be desirable to have a telecommunications network with a strict functional division between a "core network" (to which the MSC belongs) and the radio access network (which includes the RNCs). According to this strict functional division, the radio access network would handle all radio related operations (for example, the knowledge of which base stations, cells, and channels are to be used to obtain radio coverage and capacity within a certain geographical area). In other words, the core network (specifically including the MSC) would not have knowledge regarding cell structure, and more specifically would not know what particular cells form a given location area.

In a cellular network having the strict functional division described above, a problem would occur when the core network needs to page a mobile station that is idle. The page should be sent to all cells within the location area. However, the core network (e.g., the MSC) does not know to which RFNCs the page should be sent.

A similar problem can exist for a mobile station having a packet switched connection. There is no continuously reserved radio resource for the packet switched connection. Instead, the connection is maintained by using routing area updating. That is, the mobile station sends a routing area update message to the network when the mobile station comes into a new routing area. The identity of the routing area where the mobile station is currently located is stored in the RNC which controls the connection to the mobile station, known as the Serving RNC or SRNC. For limiting the above-described ping-pong effect, the mobile station's routing area may also include cells that are controlled by RNCs other than the RNC which is currently in control of the packet switched connection to the mobile station (i.e. other than the SRNC). The problem arises when the MSC is to send a packet to the mobile station, and therefore a need to page the mobile station from the base stations for each cell belonging to the routing area. In other words, somehow a page needs to be sent by RNCs other than the Serving RNC. Yet, with strict functional division, the MSC has no knowledge of the plan of the radio access network and thus no knowledge of which RNCs should be involved in paging the mobile station.

What is needed therefore, and an object of the present invention, is a technique for paging a mobile station in a multicell area, particularly when the core network does not know from which nodes a paging message should be issued.

BRIEF SUMMARY OF THE INVENTION

A radio access network portion of a telecommunications network which serves a mobile station is connecting to a core network. The radio access network portion has plural base stations serving respective plural cells, as well as plural control nodes. The control nodes include a first control node for controlling a first group of the plural base stations and a second control node for controlling a second group of the plural base stations. In a multi-group, multicell context, a multicell area includes cells served by at least some of the first group of base stations and cells served by at least some of the second group of base stations. The radio access network portion of a telecommunications network further has a paging control node which stores information regarding the multicell area.

In one mode of the invention, the multicell area is a location area comprising plural cells. In this first mode, the core network handles locating updating and paging initiation for the location area. The location updating of the first mode occurs, for example, between the core network and the mobile station when the mobile station is idle, and under such circumstances works essentially the same for both circuit-switched services and packet-switched services.

In another mode of the invention in which the mobile station subscribes to a packet switched service and updating occurs during a connection, the multicell area is a routing area comprising plural cells. The radio access network handles routing area updating and paging initiation for the routing area.

In either the location area (first) or routing area (second) modes, when the mobile station is paged in the multicell area, the paging control node (1) sends paging messages to each of the base stations serving the multicell area controlled by the paging control node; and (2) sends a paging message to any other control nodes which control base stations serving cells in the multicell area. The paging control node determines to which base stations and other control node(s) it should send paging messages by consulting a paging table. When the other control node(s) receive the paging message, those other control node(s) consult a MAP Native Cell Constituency Table to determine which base stations served thereby comprises multicell area, i.e., to which base stations the paging message should be sent.

Preferably the paging control node is one of the control nodes of the radio access network. The paging control node is connected to the other control node(s) by an inter-control node link. The paging message is sent from the paging control node to the second control node over the inter-control node link.

A response to the paging message can trigger a moveover of a serving radio network controller designation from one RNC node to another RNC node. For example, the paging control node of the present invention can initiate moveover of a serving radio network controller to from one RNC node to another RNC node. The moveover of the serving radio network controller can occur during either the first mode or the second mode.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 7 is a schematic view showing overlapping and layering of multicell areas.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
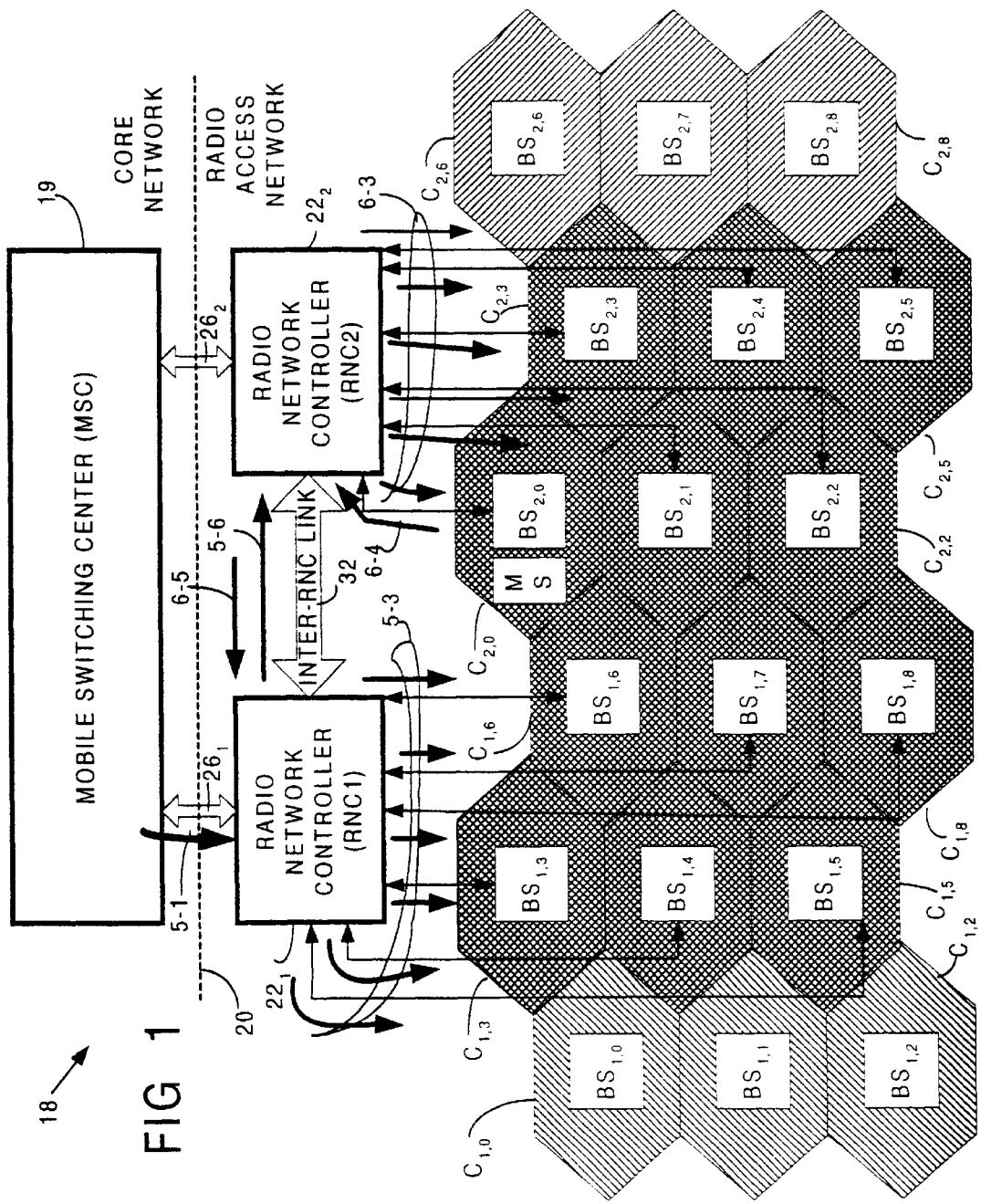
FIG. 1 is a schematic view of a telecommunications network according to a first mode of the invention showing e.g., various paging-related events therefor.

FIG. 1 shows a telecommunications network 18 which includes both a core network and a radio access network. In FIG. 1, the core network is shown above broken line 20; the radio access network is shown below line 20. The core network includes mobile switching center (MSC) 19. As shown in FIG. 1, mobile switching center (MSC) 19 is connected to one or more control nodes of radio access network, and particularly to radio network controller $22_1$ (RNC1) and radio network controller $22_2$ (RNC2). Such connection between mobile switching center (MSC) 19 and radio network controller (RNC1) $22_1$ is provided by terrestrial link $26_1$; the connection between mobile switching center (MSC) 19 and radio network controller (RNC2) $22_2$ is provided by terrestrial link $26_2$.

Radio network controller (RNC1) $22_1$ controls a first group of base stations comprising the radio access network, particularly base stations $BS_{x,y}$ of FIG. 1 for which x=1. The base stations $BS_{1,y}$ comprising the first group serve a respective first group of cells $C_{x,y}$ for which x=1. Similarly, radio network controller (RNC2) $22_2$ controls a second group of base stations comprising the radio access network, particularly base stations $BS_{x,y}$ of FIG. 1 for which x=2. The base stations $BS_{2,y}$ comprising the second group serve a respective first group of cells $C_{x,y}$ for which x=2.

Certain cells of FIG. 1 are included in what is herein referenced as a "multicell area" or "MCA". In particular, the cells C in FIG. 1 having both rising and falling cross hatching comprise the multicell area. In other words, cells $C_{1.3}$ through $C_{1.8}$ served by radio network controller (RNC1) $22_1$ and cells $C_{2.0}$ through $C_{2.5}$ served by radio network controller (RNC2) $22_2$ form the multicell area. Thus, as used herein, a multicell area or MCA is an area comprising plural cells and requiring service by more than one radio network controller (RNC) in order for all cells to be served by at least one RNC. The base stations (BS) of the cells comprising the multicell area are shown in FIG. 1 as being connected by terrestrial links to the particular RNC which controls the respective base stations. Although not illustrated, it should be understood that comparable terrestrial links are also provided for other base stations not included in the multicell area but also controlled by these RNCs.

The multicell area can be any level of cell organization superceding that of the basic cell. Examples of a multicell area are a location area and a routing area, as discussed in more detail below.

An Inter-RNC transport link 32, also known as the Inter-RNC link, connects radio network controller (RNC1) $22_1$ and radio network controller (RNC2) $22_2$ Ordinarily, the inter-RNC transport link 32 facilitates, e.g., the inter-RNC soft-handovers. In this regard, Inter-RNC transport link 32 is utilized for the transport of control and data signals between radio network controller (RNC1) $22_1$ and radio network controller (RNC2) $22_2$. Inter-RNC transport link 32 can be either a direct link or a logical link as described, for example, in International Application Number PCT/US94/12419 (International Publication Number WO 95/15665).

The Inter-RNC transport link 32 can go via a transport network and/or a signalling network and/or the core network.

A particular feature of the present invention is further employment of Inter-RNC transport link 32 for conveying paging information between RNCs. Such employment is in addition to other uses of Inter-RNC transport link 32, such as carrying cell condition information (e.g., from cells which neighbor the cell where the call is setup) or congestion messages for use in network decision making (such as call admission and call congestion control) [see U.S. patent application Ser. No. 09/035,788 filed Mar. 6, 1998 and entitled "Telecommunications Inter-Exchange Congestion Control"; U.S. patent application Ser. No. 09/035,821 (attorney docket: 2380-44) filed Mar. 6, 1998 and entitled "Telecommunications Inter-Exchange Measurement Transfer"; and U.S. patent application Ser. No. 09/036,391 filed Mar. 6, 1998 and entitled "System and Method used in a Mobile Telecommunications Network for Load Balancing Ongoing Calls between Different Base Station", all of which are incorporated herein by reference].

In accordance with the present invention, the radio access network includes a paging control node. In the example of the illustrated embodiment herein discussed, the paging control node is one of the RNCs, particularly radio network controller (RNC1) $22_1$. As described below in connection with FIG. 3A, the paging control node of the present invention includes a paging control node paging table 100 which is simulated, as hereinafter described, by TABLE 1 hereof.

Figure 3A:
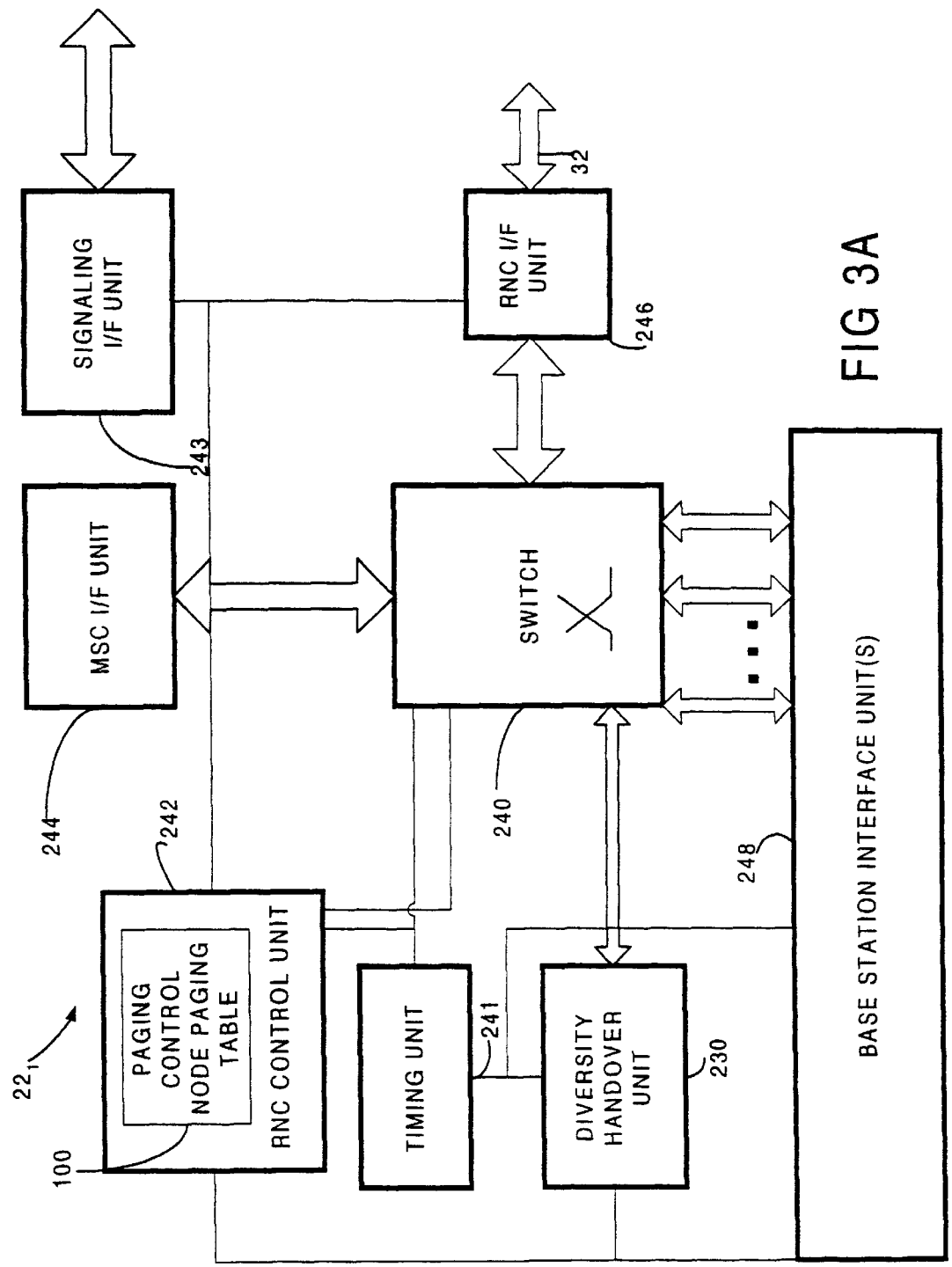
FIG. 3A is a schematic view of an example radio network controller (RNC) which operates as a paging control node in accordance with a mode of the present invention.

An example configuration of radio network controller (RNC1) $22_1$ is shown in FIG. 3A for one particular type of radio access network. The radio network controller (RNC1) $22_1$ includes a switch 240. Switch 240, which is controlled by RNC control unit 242, has a plurality of ports, some of which are connected to diversity handover unit (DHU) 230 and others of which are connected to various interfaces. Diversity handover unit (DHU) 230 is connected to a timing unit 241. The RNC control unit 242 is connected to each element of RNC $22_1$. RNC $22_1$ is connected to a signaling network via a signaling interface 243. Signaling interface 243 is connected to RNC control unit 242. The interfaces connected to ports of switch 240 include MSC interface unit 244; RNC interface unit 246; and base station interface units 248. MSC interface unit 244 is connected to the appropriate mobile switching center 19. RNC interface unit 246 is connected to inter-RNC transport link 32. Base station interface units 248 are connected to the group of base stations (BS) served by the RNC $22_1$.

TABLE 1

| Name of multicell area (MCA) | Number of cells in MCA controlled by paging control node | List of cells in MCA controlled by paging control node | Number of other RNCs controlling cells in this MCA | List of other RNCs controlling cells in this MCA | Layer of this MCA |
|---|---|---|---|---|---|
| MCA A | 6 | $C_{1,3}$; $C_{1,4}$; $C_{1,5}$; $C_{1,6}$; $C_{1,7}$; $C_{1,8}$ | 1 | RNC $22_2$ | 1 |
| MCA B | ... | ... | ... | ... | 1 |
| ... | ... | ... | ... | ... | ... |
| MCA J | ... | ... | ... | ... | ... |

In the example of FIG. 3A, the paging control node paging table 100 is stored in RNC control unit 242. As shown in TABLE 1, the paging control node paging table 100 includes a list of multicell areas, with multicell areas MCA-A through MCA-J being shown in TABLE 1. TABLE 1 has a column for the name of the multicell area, with each row of TABLE 1 corresponding to a particular named multicell area. The second column of TABLE 1 has a value indicative of the number of cells in MCA controlled by the paging control node; the third column of TABLE 1 includes a list of cells in MCA controlled by the paging control node; the fourth column of TABLE 1 has a value indicative of the number of number of RNCs (other than the paging control node) which controls cells in the MCA; the fifth column of TABLE 1 includes a list of the other RNCs controlling cells in this MCA. The sixth column of TABLE 1 identifies the layer to which the MCA belongs (the concept of "layer" is subsequently discussed with reference to TABLE 2 and FIG. 7).

TABLE 1 shows details only for MCA A, which is the particular multicell area illustrated in FIG. 1. It should be understood that detailed information is also typically included in such table for any other multicell areas for which radio network controller (RNC1) $22_1$ serves as a paging control node.

Figure 3B:
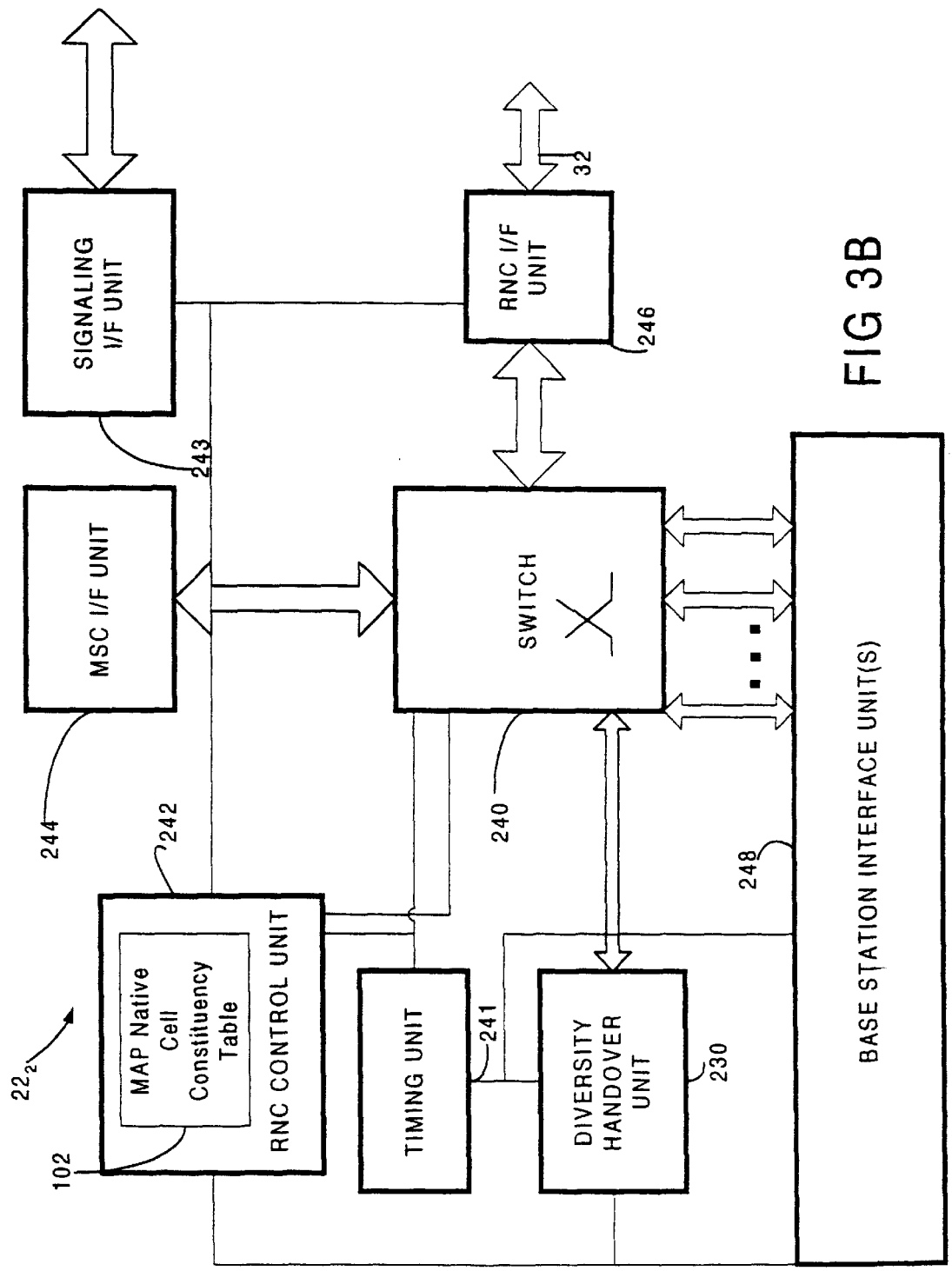
FIG. 3B is a schematic view of an example radio network controller (RNC) which does not operates as a paging control node but which nevertheless controls cells in a multicell area for which a paging control node receives a paging message from a core network.

The structure of radio network controller (RNC2) $22_2$, i.e., the RNC of FIG. 1 which in the present example does not serve as the paging control node, is shown in FIG. 3B. The structure and configuration of radio network controller (RNC2) $22_2$ of FIG. 3B is essentially the same as that of radio network controller (RNC1) $22_1$ of FIG. 3A, for which reason identical reference numerals are employed in FIG. 3A and FIG. 3B for comparable elements. However, since radio network controller (RNC2) $22_2$ is not a paging control node, the RNC control unit 242 of radio network controller (RNC2) $22_2$ does not include paging control node paging table 100. Rather, RNC control unit 242 of radio network controller (RNC2) $22_2$ has another table, herein known as the MAP Native Cell Constituency Table 102.

An example MAP Native Cell Constituency Table 102 is illustrated in TABLE 2 hereof. For the particular example of TABLE 2 herein discussed, MAP Native Cell Constituency Table 102 indicates that radio network controller (RNC2) $22_2$ is serving four distinct multicell areas, particularly MCA-A, MCA-B, MCA-K, and MCA-L. For each MCA, TABLE 2 lists the identity of the paging control node (second column of TABLE 2); the number of cells in the MCA controlled by radio network controller (RNC2) $22_2$ (third column of TABLE 2); the list of cells in the MCA controlled by radio network controller (RNC2) $22_2$ (fourth column of TABLE 2); and the layer in which the MCA resides (fifth column of TABLE 2). It should again be understood that, although information is provided in TABLE 2 primarily only for multicell area MCA-A, detailed information is also typically included in such table for any other multicell areas having cells controlled by radio network controller (RNC2) $22_2$.

TABLE 2

MAP NATIVE CELL CONSTITUENCY TABLE

| MCA NAME | IDENTITY OF PAGING CONTROL NODE FOR THIS MCA | NUMBER OF CELLS IN THIS MCA CONTROLLED BY THIS RNC | LIST OF CELLS IN THIS MCA CONTROLLED BY THIS RNC | LAYER OF THIS MCA |
|---|---|---|---|---|
| MCA-A | RNC $22_1$ | 6 | $C_{2,0}; C_{2,1};$ $C_{2,2}; C_{2,3};$ $C_{2,4}; C_{2,5};$ | 1 |
| ... MCA-B | ... | ... | ... | 1 |
| MCA-K | ... | ... | $C_{2,3}; C_{2,4};$ $C_{2,5}; C_{2,6};$ $C_{2,7}; C_{2,8};$ | 2 |
| MCA-L | ... | ... | ... | 2 |

The layer column of Table 2 is explained with reference to FIG. 7. FIG. 7 shows the four multicell areas MCA-A, MCA-B, MCA-K, and MCA-L served, at least in part by radio network controller (RNC2) $22_2$. As shown. MCA-A is partially served by radio network controller (RNC2) $22_2$ (another portion of MCA-A being served by radio network controller (RNC1) $22_1$). As set forth in TABLE 2, radio network controller (RNC2) $22_2$ maintains layers of multicell areas, in particular level 1 and layer 2 as shown in FIG. 7. In the situation illustrated in FIG. 7, multicell area MCA-A and multicell area MCA-B are on layer 1, while multicell area MCA-K and multicell area MCA-L are on layer 2.

Thus, radio network controller (RNC2) $22_2$ associates each multicell area with a layer of multicell areas maintained by radio network controller (RNC2) $22_2$. This layer designation is particularly important in the case of overlapping multicell areas. FIG. 7 shows that multicell area MCA-A and multicell area MCA-K overlap in an overlap area OA-Q. The importance of the layer designation stems from the fact that, in the paging message, the mobile station MS can be identified by a temporary mobile station identifier (TMSI) with respect to the multicell area in which it currently resides. The assignment of a TMSI for a mobile station MS with respect to a multicell area is complicated by the fact that another multicell area may use the same TMSI for another mobile station. In other words, differing multicell areas may being using the same TMSIs for differing mobiles.

In view of the foregoing, it should be understood that two mobile stations with the same TMSI, but belonging to differing multicell areas (MCA-A and MCA-K), may be in overlap area OA-Q at the same time. If a paging message is issued with respect to cells in multicell area MCA-A, without information more than the TMSI of the paged mobile station, it may occur that both mobile stations would respond. However, in the present invention, upon receipt of a paging message from radio network controller (RNC1) $22_1$ relative to multicell area MCA-A and prior to sending the paging message of event 6-3, radio network controller (RNC2) $22_2$ determines that multicell area MCA-A is in layer 1. Therefore, radio network controller (RNC2) $22_2$ includes the layer designation in the paging message. The other mobile in the overlap area OA-Q, although recognizing the same TMSI, knows from the layer parameter that the paging message is intended for multicell area MCA-A rather than multicell area MCA-K, and therefore does not respond. Only the mobile station MS to which the paging message is intended responds, despite possible double assignment of TMSI values within the overlap area OA-Q.

Thus, in one aspect of the invention involving multicell areas, each MCA is assigned to a multicell area (MCA) layer. The assignment of a MCA layer parameter can be performed by the paging control node. The cells of each RNC involved in the paging for the multicell area are sent paging messages which contain the MCA layer parameter. For this reason, both TABLE 1 (for radio network controller (RNC1) $22_1$) and TABLE 2 (FOR radio network controller (RNC2) $22_2$) includes MCA layer parameters. Also, the paging messages can include MCA layer parameters.

Insofar as multicell area layers are concerned, the mobile station MS must also be made aware of which layer it is registered in or belongs to. Informing the mobile station MS of multicell area layer can be accomplished in the locating updating and/or routing area updating procedures. For example, the multicell area layer parameter can be provided directly in a location registration response message or implicitly by allowing the mobile station MS and network to select a specific multicell area (with its corresponding multicell area layer parameter) which is published as the "registration multicell area" broadcasted in system information in the cell where the mobile station MS is registering.

In one scenario of the multicell area layering of the present invention, a multicell area has the same multicell area layer parameter for all RNCs having cells belonging to the multicell area. In another scenario, on the other hand, a multicell area is viewed at differing RNCs as having a differing multicell area layer parameter. In this other scenario, the network publishes all multicell area information (including multicell area layer parameters) in broadcasted system information in each cell. When paging the mobile station MS, each cell paging message contains the multicell area layer parameter of the paged mobile station MS as published for each specific cell. This other scenario essentially moves the multicell area layer parameter to a cell level, and obviates the MCA layer parameters in TABLE 1 and TABLE 2.

Figure 2:
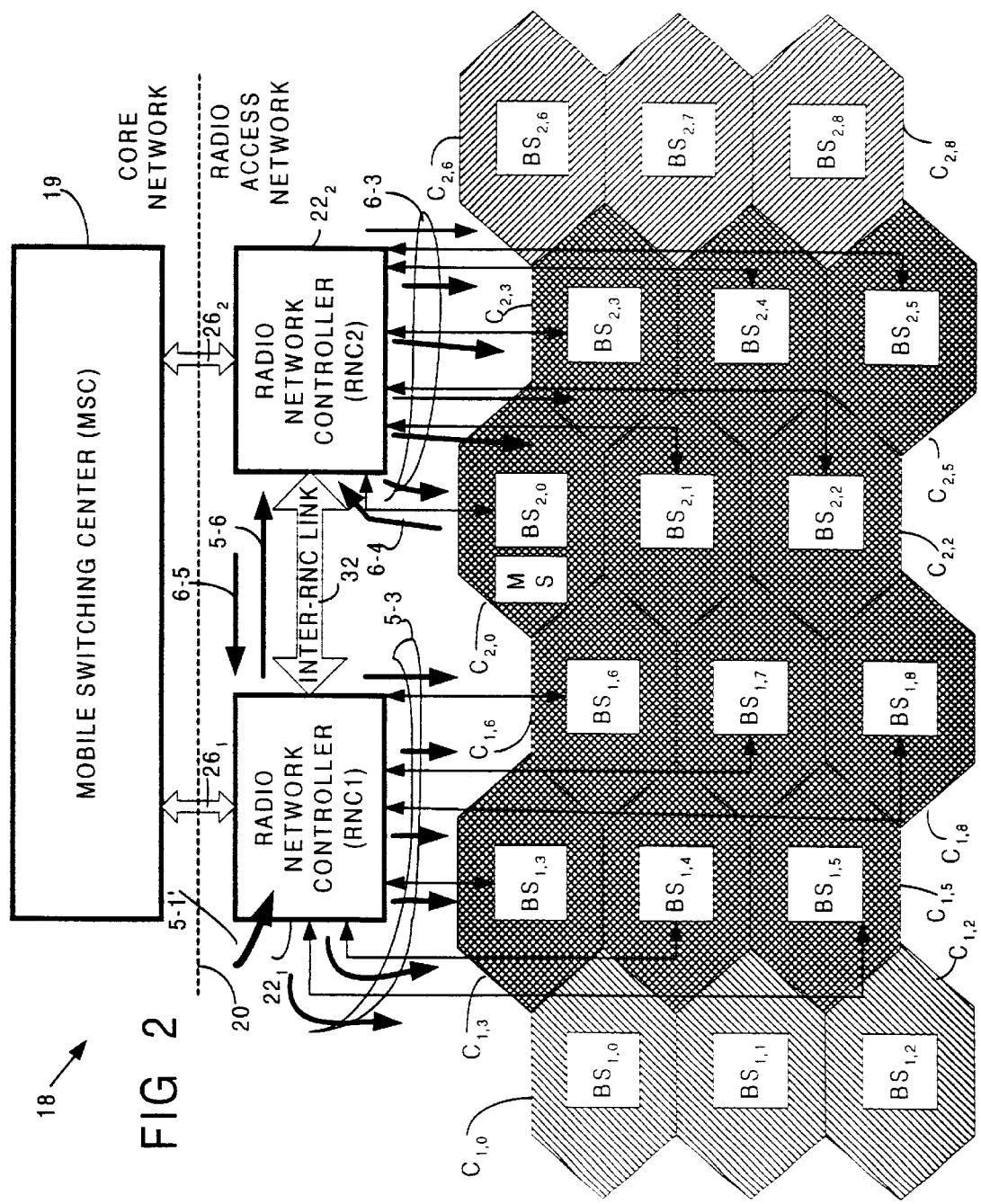
FIG. 2 is a schematic view of a telecommunications network according to a second mode of the invention showing e.g., various paging-related events therefor.

An example of a first mode of operation of the present invention is illustrated with respect to FIG. 1; an example of operation of a second mode is illustrated with respect to FIG. 2. In this first mode, the core network handles locating updating and paging initiation for the location area. The location updating of the first mode occurs, for example, between the core network and the mobile station when the mobile station is idle, and under such circumstances works essentially the same for both circuit-switched services and packet-switched services. The second mode of the invention is applicable when the mobile station has a packet-switched connection, with the multicell area being a routing area comprising plural cells. In the second mode, the radio access network handles routing area updating and paging initiation for the routing area.

Figure 5:
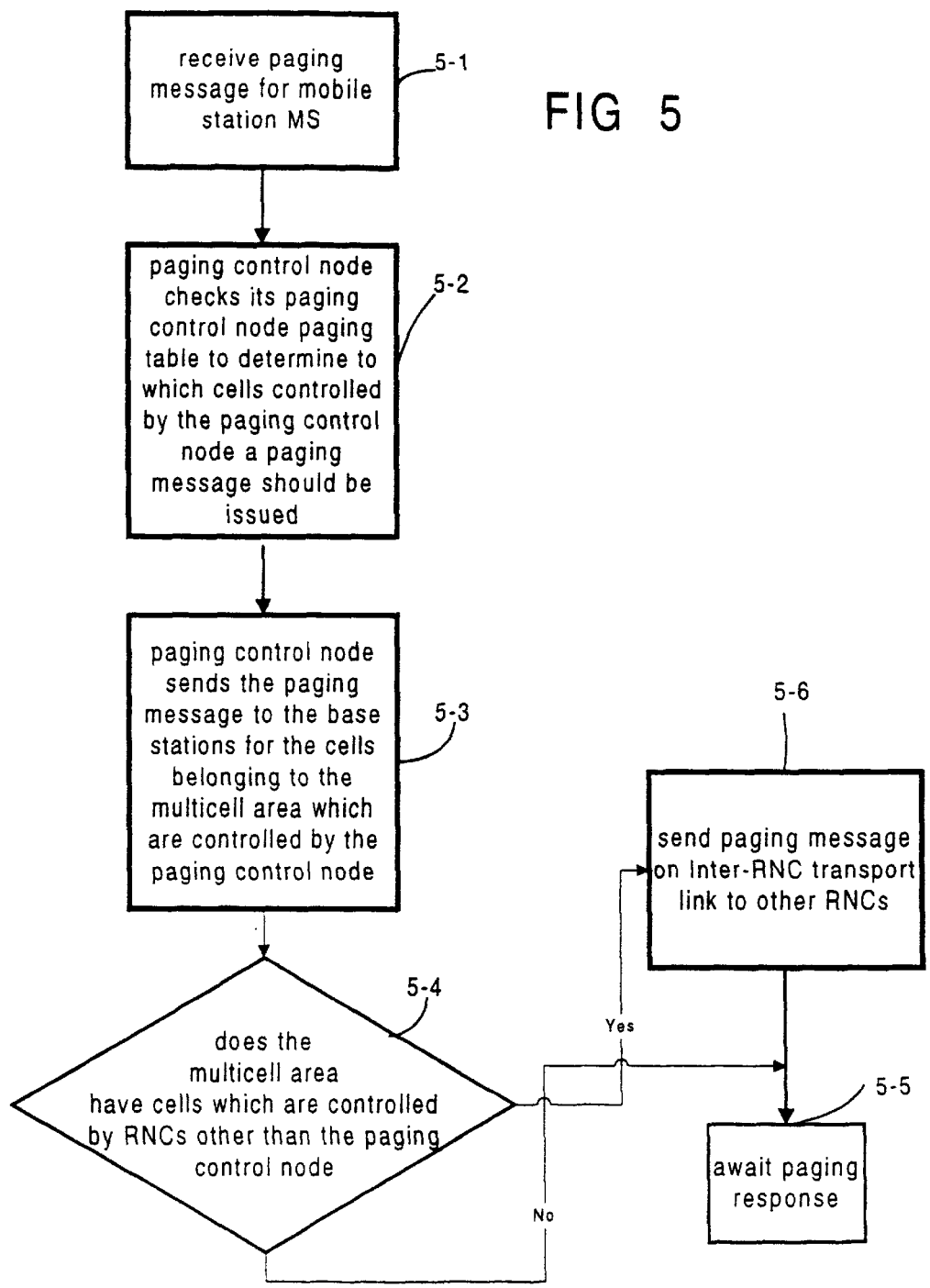
FIG. 5 is a flowchart showing basic steps performed at a paging control node in one illustrative mode of a paging technique utilized in the network of FIG. 1.

General events involved in both the first mode and the second mode are generically illustrated in FIG. 5 and FIG.

6. FIG. 5 basically shows events performed by radio network controller (RNC1) $22_1$ (which functions as the paging control node in the illustrated embodiment), while FIG. 6 basically shows events performed by radio network controller (RNC2) $22_2$.

FIG. 5 shows, as event 5-1, the paging control node, particularly radio network controller (RNC1) $22_1$, receiving a paging message. In the mode of the invention pertaining to location areas, the paging message for the mobile station is initiated by the core network, particularly mobile switching center (MSC) 19 in the manner shown by event 5-1 in FIG. 1. Event 5-1 in FIG. 1 is thus reception of a CN-RAN paging message, i.e., core network-radio access network paging message. On the other hand, in the second mode of the invention pertaining to packet switched services, the page can be initiated by a radio network controller, e.g., radio network controller (RNC1) $22_1$, as shown by event 5-1 in FIG. 2.

Regarding the CN-RAN paging message of event 5-1 illustrated in FIG. 1, mobile station MS has previously send a location update or comparable message to the core network. On the basis of the update, the home location register (HLR) for the mobile station MS points to the appropriate visiting location register (VLR). The visiting location register (VLR) knows the current multicell area MCA-A for the mobile station MS, and forwards this information to the mobile switching center (MSC) 19. The page to the mobile switching center (MSC) 19 from the visiting location register (VLR) carries the current multicell area MCA-A for the mobile station MS. Commonly the mobile switching center (MSC) 19 and visiting location register (VLR) are collocated in the same node (denoted MSC/VLR). Mobile switching center (MSC) 19 then consults a table to determine which RNC serves as the paging control node for the multicell area in which mobile station MS was last located. In the particular example of FIG. 1, such paging control node is radio network controller (RNC1) $22_1$, so that the paging message of event 5-1 is sent to radio network controller (RNC1) $22_1$. The paging message of event 5-1 includes an indentifier of the multicell area in which mobile station MS was last located.

Upon receipt of the event 5-1 paging message, as event 5-2 the paging control node (i.e., radio network controller (RNC1) $22_1$) checks its paging table 100 to determine to which cells controlled by the paging control node a paging message should be issued. In the example under discussion, the paging control node checks TABLE 1 to determine which cells controlled by radio network controller (RNC1) $22_1$ are to be paged. From TABLE 1 the radio network controller (RNC1) $22_1$ obtains the identity of such cells, using the multicell area identifier (MCA-A) to locate the proper row of TABLE 1. The identity of the cells to which a paging message is to be sent is gleaned from the third column of TABLE 1. As event 5-3, the paging control node sends the paging message to the base stations for the cells belonging to the multicell area which are controlled by the paging control node.

As event 5-4, the paging control node also determines whether the multicell area identified by the paging message of event 5-1 includes cells which are controlled by RNCs other than the paging control node. Such is the case for the example of FIG. 1, since radio network controller (RNC2) $22_2$ controls the second group of cells (i.e. cells $C_{2,0}$ through $C_{2,5}$) comprising multicell area MCA-A.

In the case in which the multicell area identified by the paging message of event 5-1 includes cells which are controlled by RNCs other than the paging control node, the paging control node (i.e., radio network controller (RNC1) $22_1$ sends a paging message on Inter-RNC transport link 32 to such other RNCs as event 5-6.

Figure 4A:
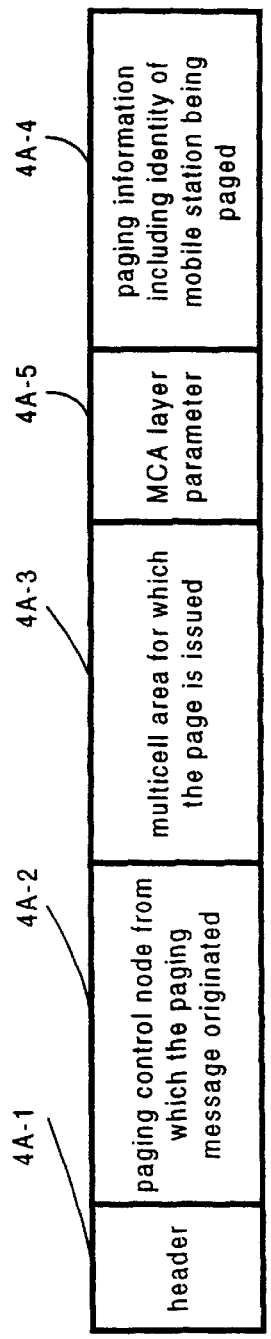
FIG. 4A is a diagrammatic view of an example format for a paging message sent over an Inter-RNC transport link from the radio network controller of FIG. 3A to the radio network controller of FIG. 3B.

An example format for the paging message sent on Inter-RNC transport link 32 to such other RNCs as event 5-6 is shown in FIG. 4A. The paging message of event 5-6 includes a header 4A-1 which identifies the node to which the paging message is destined, e.g., radio network controller (RNC2) $22_2$. In addition, the paging message of event 5-6 specifies (as field 4A-2) the identity of paging control node from which the paging message originated, as well (as field 4A-3) an identification of the multicell area for which the page is issued. In addition, the paging message of event 5-6 includes typical paging information (indicated by field 4A-4) including the identity of the mobile station MS being paged. In the situation of layering of multicell areas as above discussed with respect to FIG. 7, the paging message of FIG. 4A can also include a field 4A-5 specifying the multicell area layer parameter (as assigned, e.g., by the paging control node).

Event 5—5 shows the paging control node awaiting a paging response. The paging response may come from one of the cells controlled by radio network controller (RNC1) $22_1$ in response to the paging message(s) sent at event 5-3. Alternatively, as described in more detail in connection with FIG. 6, the paging control node may receive the paging response over Inter-RNC transport link 32 from another RNC, e.g., radio network controller (RNC2) $22_2$, in response to the paging message sent as event 5-6. It should be understood that reception of a paging response can occur at any time after event 5-3, and that a time out period is preferably established within which a paging response message must be received.

Figure 6:
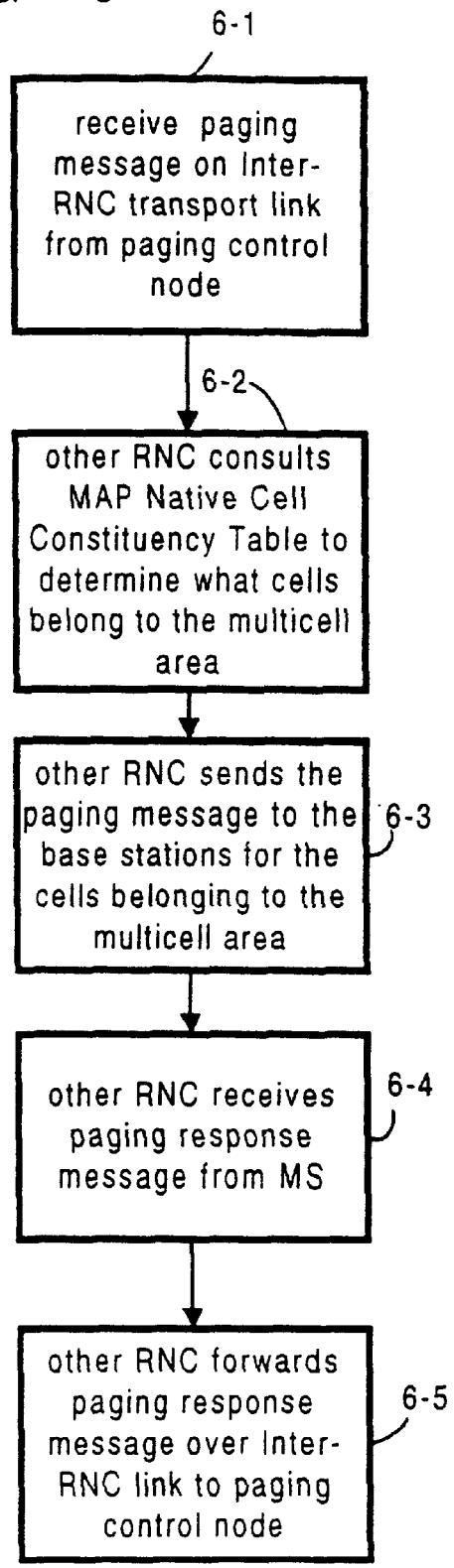
FIG. 6 is a flowchart showing basic steps performed at a radio network controller (RNC) (not serving as a paging control node) in one illustrative mode of the paging technique of FIG. 5.

FIG. 6 shows events performed by the other RNC, e.g., the radio network controller (RNC2) $22_2$, upon receipt of the paging message of event 5-6 of FIG. 5. The paging message of event 5-6, also known as the Inter-RNC paging message, is received over Inter-RNC transport link 32. Upon receiving the paging message of event 5-6 over Inter-RNC transport link 32 (event 6-1), as event 6-2 the radio network controller (RNC2) $22_2$ consults its MAP Native Cell Constituency Table 102 (see FIG. 3B and TABLE 2). The check of event 6-2 is for determining what cells controlled by radio network controller (RNC2) $22_2$ belong to the multicell area identified by the paging message of event 5-6. After the check of event 6-2, as event 6-3 the radio network controller (RNC2) $22_2$ sends the paging message to the cells controlled thereby in such multicell area as a RNC-BS paging message.

As shown in FIG. 1, it so happens that mobile station MS resides in $C_{2,0}$ at the time that the paging messages of event 6-3 are transmitted. The mobile station MS in cell $C_{2,0}$ receives a page over the interface from base station $BS_{2,0}$. In response to the page message received over the air interface, mobile station MS returns over the air interface to base station $BS_{2,0}$ a paging response message (MS-BS paging response message). As shown by event 6-4, base station $BS_{2,0}$ forwards the paging response message (BS-RNC paging response message) to radio network controller (RNC2) $22_2$. Upon receipt of the paging response message of event 6-4, as event 6-5 the radio network controller (RNC2) $22_2$ sends a paging response message (Inter-RNC paging response message) over Inter-RNC transport link 32 to the paging control node, i.e., to radio network controller (RNC1) $22_1$. Upon receipt of the paging response message of event 6-5, the radio network controller (RNC1) $22_1$ functions to make the connection between the calling party from the core network and mobile station MS.

Figure 4B:
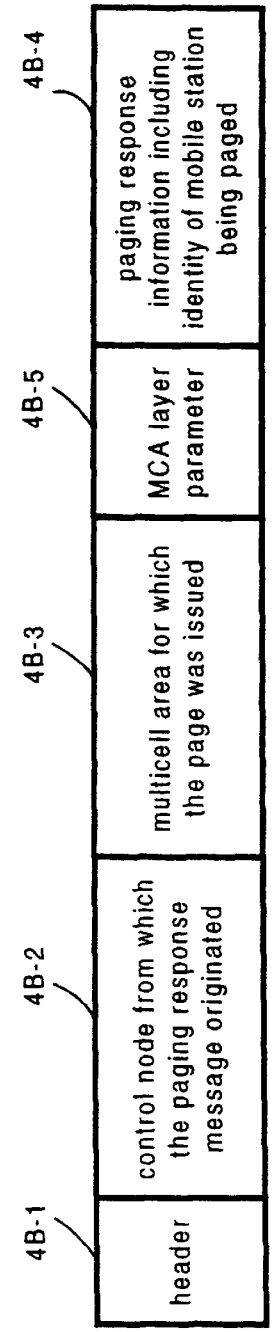
FIG. 4B is a diagrammatic view of an example format for a paging response message sent over an Inter-RNC transport link from the radio network controller of FIG. 3B to the radio network controller of FIG. 3A.

An example format for the paging response message sent on Inter-RNC transport link 32 from radio network controller (RNC2) $22_2$ to radio network controller (RNC1) $22_1$ as event 6-5 is shown in FIG. 4B. The paging response message of event 6-5 includes a header 4B-1 which identifies the node to which the paging response message is destined, e.g., radio network controller (RNC1) $22_1$. In addition, the paging response message of event 6-5 specifies (as field 4B-2) the identity of paging control node from which the paging response message originated, as well (as field 4B-3) an identification of the multicell area for which the page was issued. In addition, the paging response message of event 6-5 includes (as field 4B-4) typical paging response information including the identity of the mobile station being page. In the situation of layering of multicell areas as above discussed with respect to FIG. 7, the paging response message of FIG. 4B can also include a field 4B-5 specifying the multicell area layer parameter.

In FIG. 5, for sake of simplicity, event 5-6 has been shown to occur subsequent to earlier numbered events such as event 5-3. Such need not necessarily be the case, however, as the events occurring with respect to the cells controlled by RNC $22_2$ can be timed to occur in another manner, such as essentially contemporaneously with the paging in the cells controlled by $RNC22_1$, for example.

In the foregoing description, the mobile switching center (MSC) 22 need only store the address of one RNC for each location area, which is the paging control node for that location area. Preferably such paging control node RNC has cells within that location area. The page is then sent to the paging control node, which has the knowledge (via paging control node paging table 100) of (1) which cells under its control are part of the location area, and (2) which other RNCs (if any) have cells within that location area. Thus, the paging control RNC, which received the paging message from mobile switching center (MSC) 22, distributes the page to (1) all base stations under its control corresponding to cells in the location area, and over Inter-RNC transport link 32 to (2) all other RNCs that have cells within the location area. Each of the other RNCs know which cells under their control are part of the location area (see e.g., MAP Native Cell Constituency Table 102). These other RNCs distribute the paging message to cells which they control which are part of the location area.

In context of a packet switched connection, a page can be initiated by an RNC, e.g., as shown by radio network controller (RNC1) $22_1$ and event 5-1 in FIG. 2. In this second mode of the invention, the multicell area can be a routing area. In other respects, events of the second mode in FIG. 2 are essentially the same as above described with respect to the first mode and FIG. 1.

In general, for each mobile station MS having a connection to the radio access network, there is an RNC which serves as a Serving RNC (SRNC). The Serving RNC (SRNC) handles the connection between the mobile station MS and the radio access network as well as the connection to the core network. The SRNC stores the location of the mobile station MS, and in the case of a packet-switched connection, particularly stores the routing area of the mobile station MS.

The present invention also involves, for both the mode of FIG. 1 and FIG. 2, initiation of a SRNC moveover procedure in connection with the paging. Three differing scenarios of SRNC moveover procedure are illustrated with respect to FIG. 1A, FIG. 1B, and FIG. 1C, respectively.

Each of the three scenarios of SRNC moveover follow (e.g., occur subsequently to) various events described in FIG. 5 and FIG. 6. In this regard, in the general manner of FIG. 5, the paging control node (e.g., a SRNC) sends the page request to all RNCs that have cells within the routing area, including the base stations controlled by the SRNC that initiated the page. The page utilizes the Inter-RNC transport link 32. The other RNCs then distribute the page to the cells, as in the manner described in connection with FIG. 6. In the three scenarios of SRNC moveover illustrated, radio network controller (RNC1) $22_1$ is the Serving RNC (SRNC) for the particular mobile station MS. Both radio network controller (RNC1) $22_1$ and radio network controller (RNC2) $22_2$ distribute base station paging messages to all base stations corresponding to cells in the routing area. The base stations further send paging messages on the paging channels over the air interface to the respective cells. The mobile station MS answers in one of the cells. Upon answering, a paging response message is received at an RNC.

In the three SRNC moveover scenarios, it is assumed that the RNC which receives the paging response from the mobile station MS is other than the SRNC (i.e., the RNC which initiated the paging distribution).

Figure 1A:
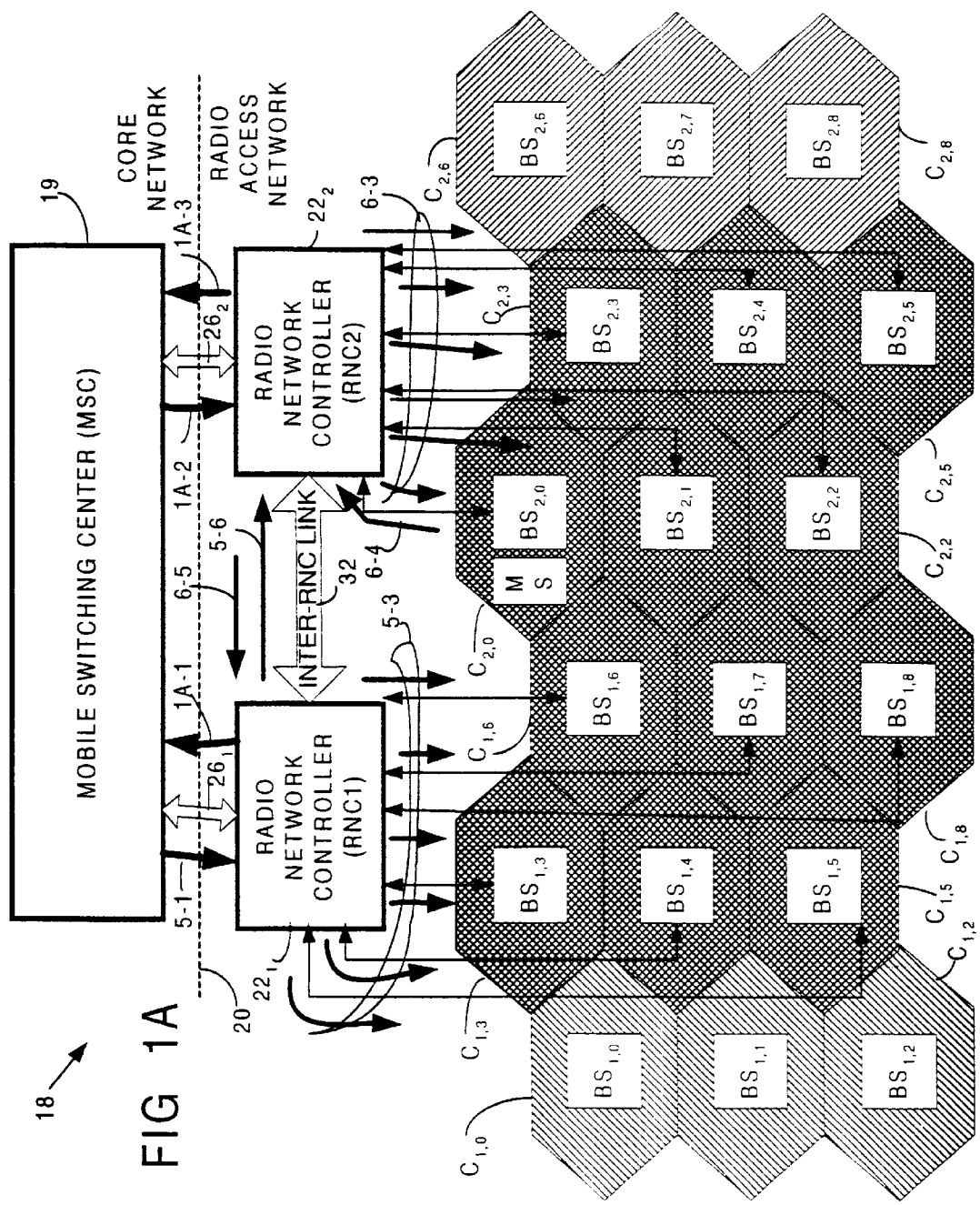
FIG. 1A, FIG. 1B, and FIG. 1C are schematic views of a telecommunications network respective SRNC moveover scenarios.
Figure 1B:
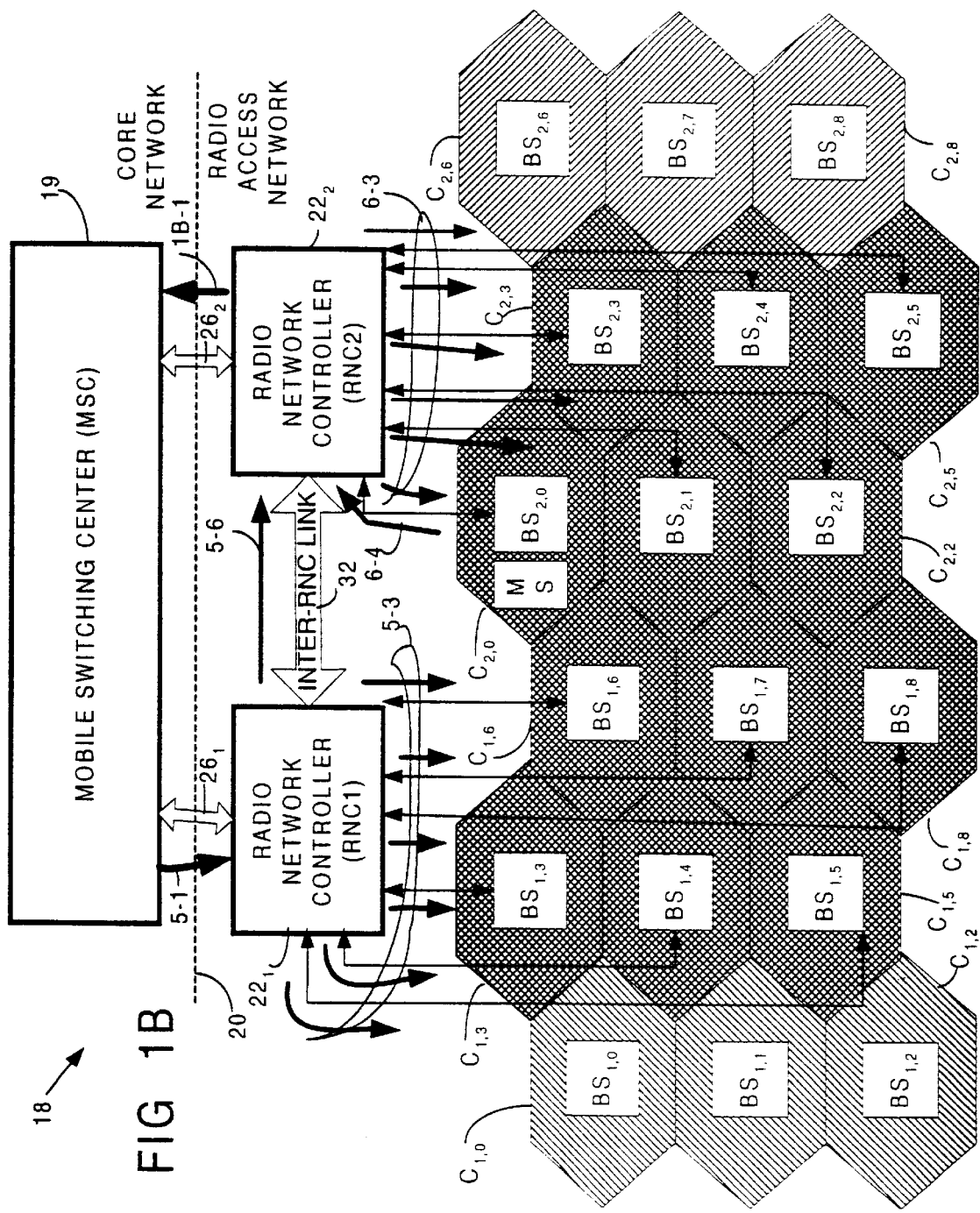
Figure 1C:
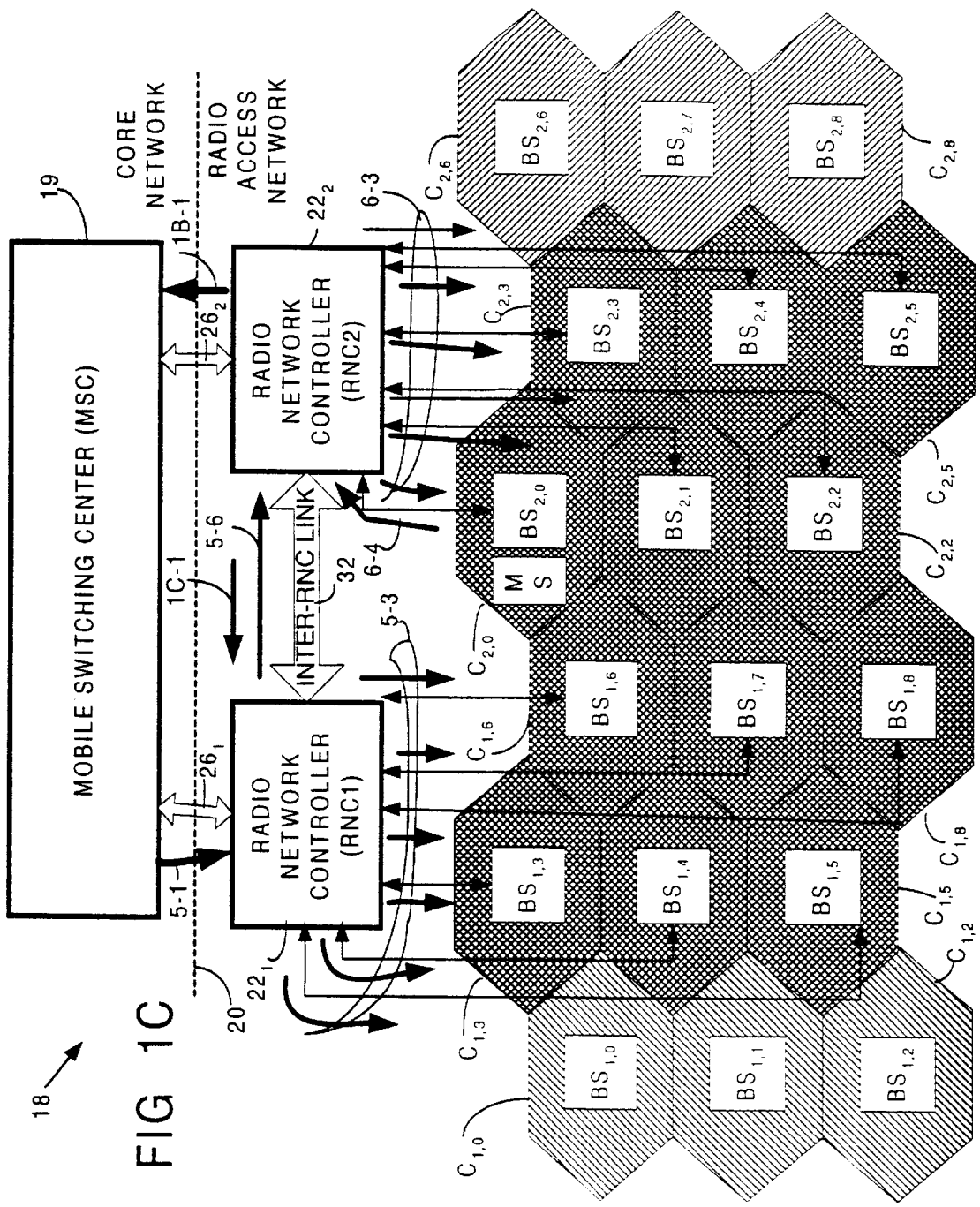

In the first scenario of SRNC moveover illustrated in FIG. 1A, radio network controller (RNC1) $22_1$ initiates moveover of the Serving RNC (SRNC) functionality (e.g., handling of the connection between the mobile station MS and the radio access network as well as the connection to the core network). That is, the Serving RNC (SRNC), e.g., radio network controller (RNC1) $22_1$ (also serving as the paging control node) has determined from event 6-5 that another RNC (e.g., radio network controller (RNC2) $22_2$) has received the paging response message from mobile station MS. Upon completion of the SRNC moveover, that radio network controller (RNC2) $22_2$ [rather than radio network controller (RNC1) $22_1$] is considered as the Serving RNC (SRNC) for the mobile station MS. In the scenario of FIG. 1A, the paging response message is sent back over Inter-RNC transport link 32 to the SRNC (i.e., radio network controller (RNC1) $22_1$) as event 6-5 in the manner previously described.

In the SRNC moveover scenario of FIG. 1A, after event 6-5 the paging control node (radio network controller (RNC1) $22_1$) sends an SRNC moveover request message via mobile switching center (MSC) 19 to the core network, as indicated by event 1A-1. The SRNC moveover request message of event 1A-1 indicates both the identity of the mobile station MS, as well as the address of the RNC which will serve as the new Serving RNC (SRNC) for the mobile station MS (e.g., radio network controller (RNC2) $22_2$).

Upon receipt of the SRNC moveover request message of event 1A-1, the core network contacts the new Serving RNC (SRNC) [e.g. radio network controller (RNC2) $22_2$] as event 1A-2. In response to the contact of event 1A-2, radio network controller (RNC2) $22_2$ can send the paging response message from mobile station MS directly to the core network as shown by event 1A-3. The connection between the core network and the new Serving RNC (SRNC) (i.e. radio network controller (RNC2) $22_2$) is thus established.

In the foregoing first SRNC moveover scenario, it should be understood that the SRNC moveover request message sent from radio network controller (RNC1) $22_1$ to the core network can include, or be accompanied by, the paging response message from the mobile station MS (since the paging response message was received by radio network controller (RNC1) $22_1$ over Inter-RNC transport link 32 as event 5-6 ).

In the second SRNC moveover scenario, the RNC which received the paging response message from the mobile station MS, i.e., radio network controller (RNC2) 22₂ sends the paging response message directly to the core network (i.e., to MSC 19) as event 1B-1 without involving the paging control node (i.e., radio network controller (RNC1) 22₁). Thus, in the second SRNC moveover scenario, event 6-5 does not occur. Rather, forwarding of the paging response message from radio network controller (RNC2) 22₂ to the core network prompts the core network to change to radio network controller (RNC2) 22₂ as the SRNC for the mobile station. When the former SRNC (i.e., radio network controller (RNC1) 22₁ times out after sending the paging message with no response), so that no further activity is conducted at radio network controller (RNC1) 22₁ regarding the paging of mobile station MS.

In the third SRNC moveover scenario (see FIG. 1C) resembles the second scenario, with the RNC which received the paging response message from the mobile station MS sending the paging response message directly to the core network (i.e., to MSC 19) as event 1B-1 without involving the paging control node (i.e. radio network controller (RNC1) 22₁). In addition, in the third SRNC moveover scenario of FIG. 1C the new SRNC (i.e., radio network controller (RNC2) 22₂) sends an advisory message to the paging control node (i.e., the former SRNC, radio network controller (RNC1) 22₁) informing that the mobile station MS has responded.

Although the foregoing three scenarios of SRNC moveover have been described only in the context of the first mode (which involves location area), it should be understood that the three scenarios are equally applicable to the second mode (which involves routing area). In the second mode, the paging is initiated by the RAN (as above described relative to event 5-1' of FIG. 2) rather than by the core network. Moreover, in the second mode of the invention, the paging response is not returned to the core network as in the case of the first mode.

It should be understood that SRNC moveover can be prompted for reasons other than those described above. For example, SRNC moveover may be initiated for reasons such as routing area updating, cell updating, and diversity handling, e.g., soft handover (macrodiversity splitting/combining) [see U.S. patent application Ser. No. 08/980,013 filed Nov. 26, 1997 and entitled "Diversity Handling Moveover for CDMA Mobile Telecommunications", which is incorporated herein by reference].

The present invention allows for location areas and routing areas to cover more than one RNC. Moreover, advantageously, the core network need not know the internal configuration of the radio access network respecting location area or routing area, thereby permitting strict functional division between the core network and the radio access network. In other words, the paging distribution of the present invention is accomplished totally within the radio access network, and thus is hidden from the core network.

Moreover, overlapping location areas and routing areas (as described in FIG. 7) are possible, with the such overlapping topology being hidden from and not affecting the core network. Thus, overlapping multicell areas can be introduced in the radio access network without significantly affecting the core network. In this regard, for a GSM-based core network, this is particularly advantageous since only minor modifications are needed in the core network.

The foregoing has described a radio access network having two RNCs, with each RNC controlling nine base stations, and with a multicell area comprising twelve cells (six of which are controlled by radio network controller (RNC1) 22₁ and six of which are controlled by radio network controller (RNC2) 22₂). It should be understood that the foregoing network topology is merely one example, and that other network topologies are encompassed by the present invention. In this regard, the parameters of the foregoing are not critical. For example, the number of RNCs can vary, as well as the number of base stations controlled by each RNC. Furthermore, the number of cells comprising the multicell area will vary for each implementation, as well as the association of constituent cells of the multicell area to RNCs. It should readily be recognized that an multicell area may be served by more than two RNCs, in which case the paging control node (e.g., radio network controller (RNC1) 22₁ in the illustrated example) will send the paging message of event 5-6 to such other RNCs as well.

In the illustrated embodiment, the paging control node was selected to be one of the RNCs, particularly radio network controller (RNC1) 22₁. The person skilled in the art should understand that the paging control node can instead be another RNC, or even vet a non-RNC node. For example, the paging control node may be a specialized node which serves one of the RNCs of radio access network. Further, the paging control node may serve several RNCs.

It should also be understood that the configuration of radio network controller (RNC1) 22₁ as shown in FIG. 3 is but one illustrative example, and that other configurations can be utilized consistently with the present invention. Moreover, whereas in FIG. 3 paging control node paging table 100 has been included in RNC control unit 242, it should be appreciated that paging control node paging table 100 can be situated elsewhere.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications system comprising:
   a radio access network which handles radio-related operations, the radio access network comprising:
      first radio network control node which controls a first group of base stations and which serves as a serving radio network control node for controlling a connection with a mobile station;
      a second radio network control node which controls a second group of base stations and which serves as a drift radio network control node for the connection with the mobile station;
   wherein when a paging response message is received from the mobile station, one of the serving radio network control node and the drift radio network control node initiates a moveover request to move control of to connection through to radio access network with the mobile station from the serving radio network control node to the drift radio network control node whereby the drift radio network control node becomes the control node newly controlling the connection with the mobile station.

2. The apparatus of claim 1, further comprising a page originating entity which issues a paging message to the mobile station.

3. The apparatus of claim 2, wherein the paging message includes a mobile station identifier for a mobile station being paged and an area identifier representing a last known multicell area for the mobile station, the paging message being addressed to a radio network control node currently serving as a paging radio network control node for the last known multicell area as represented by the area identifier, the paging response message from the mobile station being in response to the paging message from the page originating entity.

4. The apparatus of claim 2, wherein the page originating entity is in a core network.

5. The apparatus of claim 2, wherein the page originating entity is a mobile switching center.

6. The apparatus of claim 1, wherein the moveover request is sent to a core network.

7. The apparatus of claim 6, wherein after the core network moves control of the connection with the mobile station, the control node newly controlling the connection with the mobile station sends the paging response message to the core network.

8. The apparatus of claim 1, wherein the moveover request message takes the form of the drift radio network control node sending the paging response message to the core network.

9. The apparatus of claim 1, wherein the drift radio network control node initiates a moveover request and wherein, after moveover of control of the connection with the mobile station, the control node newly controlling the connection with the mobile station sends an advisory message to the radio network control node which formerly served as the serving radio network control node to advise that the mobile station has responded to the paging message.

10. For use in a telecommunications system comprising a page originating entity for paging a mobile station and a access network which handles radio-related operations, the radio access network comprising plural radio network control nodes including a first radio network control node and a second radio network control node, the first radio network control node controlling a first group of base stations and being a serving radio network control node for the mobile station, the second radio network control node controlling a second group of plural base stations and being a drift radio network control node for the mobile station, a method comprising:

issuing, from a page originating entity, a paging message to the mobile station;

receiving a paging response message from the mobile station; and then initiating, from one of the serving radio network control node and the drift radio network control node, and in response to the paging response message; a moveover request to move control of the connection through the radio access network with the mobile station from the serving radio network control node to the drift radio network control node whereby the drift radio network control node becomes the control node newly controlling the connection with the mobile station.

11. The method of claim 10, wherein the paging message includes a mobile station identifier for the mobile station and an area identifier, the area identifier representing a last known multicell area for the mobile station.

12. The method of claim 10, wherein the page originating entity is in a core network.

13. The method of claim 12, wherein the page originating entity is a mobile switching center.

14. The method of claim 10, further comprising sending the moveover request to a core network.

15. The method of claim 14, wherein after the core network moves control of the connection with the mobile station, the control node newly controlling the connection with the mobile station sends the paging response message to the core network.

16. The method of claim 10, wherein the moveover request message takes the form of the drift radio network control node sending the paging response messages to the core network.

17. The method of claim 10, further comprising:

the drift radio network control node initiating the moveover request, and wherein, after moveover of control of the connection with the mobile station;

sending, from the control node newly controlling the connection with the mobile station, an advisory message to the radio network control node which formerly served as the serving radio network control node to advise that the mobile station has responded to the paging message.

18. A telecommunications system comprising:

a radio access network the radio access network comprising plural cells and plural radio network control nodes including a first radio network control node for controlling a first group of cells and a second radio network control node for controlling a second group of plural cells;

a page originating entity which issues a paging message which includes a mobile station identifier for a mobile station being paged and an area identifier for the mobile station being paged, the paging message being addressed to one of the plural radio network control nodes currently serving as a paging radio network control node for a multicell area represented by the area identifier;

wherein the paging radio network control node, upon receipt of to paging message from the page originating entity:

(1) obtains from information stored at the radio access network an internal configuration of the multicell area represented by the area identifier, the internal configuration including at least one of (a) one or more cells under control of the paging radio network control node included in a last known multicell area; and (b) another of the plural radio network control nodes which serves cells included in the multicell area;

(2) issues a paging message in accordance with the internal configuration.

19. The apparatus of claim 18, wherein a table is maintained by the paging radio network control node.

20. The apparatus of claim 18, wherein the page originating entity does not know the internal configuration of the last known multicell area represented by the area identifier.

21. The apparatus of claim 18, wherein the page originating entity is in a core network.

22. The apparatus of claim 18, wherein the page originating entity is a mobile switching center.

23. The apparatus of claim 18, wherein the paging radio network control node serves as a serving radio network control node which controls a connection through the radio access network with the mobile station, and the another of the plural radio network control nodes serves as a drift radio network control node.

24. The apparatus of claim 23, wherein the drift radio network control node transmits to at least portions of plural multicell areas, each of the plural multicell areas being assigned a layer parameter, and wherein for specifying which layer is to be paged the paging message includes the layer parameter for the last known multicell area for the mobile station being paged.

25. The apparatus of claim 24, wherein the mobile station identifier is a temporary mobile station identifier (TMSI).

26. The apparatus of claim 23, wherein the serving radio network control node and the drift radio network control node are connected by a physical inter-control node link, and wherein the paging message is transmitted over the physical inter-control node link.

27. The apparatus of claim 23, wherein when a paging response message is received from the mobile station being paged, one of the serving radio network control node and the drift radio network control node initiates a moveover request to move control of the connection through the radio access network with the mobile station from the serving radio network control node to the drift radio network control node whereby the drift radio network control node becomes the control node newly controlling the connection with the mobile station.

28. The apparatus of claim 23, wherein the moveover request is sent to a core network.

29. The apparatus of claim 28, wherein after the core network moves control of the connection with the mobile station, the control node newly controlling the connection with the mobile station sends the paging response message to the core network.

30. The apparatus of claim 27, wherein the moveover request message takes the form of the drift radio network control node sending the paging response message to the core network.

31. The apparatus of claim 27, wherein the drift radio network control node initiates a moveover request, and wherein, after moveover of control of the connection with the mobile station, the control node newly controlling the connection with the mobile station sends an advisory message to the radio network control node which formerly served as the serving radio network control node to advise that the mobile station has responded to the paging message.

32. For use in a telecommunications system comprising a radio access network, the radio access network comprising plural cells and plural radio network control nodes including a first radio network control node for controlling a first group of cells and a second radio network control node for controlling a second group of plural cells, a method comprising:
   issuing, from a page originating entity, a paging message which includes a mobile station identifier for a mobile station being paged and an area identifier, the area identifier representing a multicell area for the mobile station being paged, the paging message being addressed to one of the plural radio network control nodes currently serving as a paging radio network control node for the multicell area for the mobile station as represented by the area identifier;
   upon receipt of the paging message from the page originating entity, the paging radio network control node:
   obtaining from information stored at the radio access network an internal configuration of the multicell area represented by the area identifier, the internal configuration including at least one of (a) one or more cells under control of the paging radio network control node included in the last known multicell area; and (b) another of the plural radio network control nodes which serves cells included in the multicell area;
   issuing a paging message in accordance with the internal configuration.

33. The method of claim 32, further comprising maintaining a table at the paging radio network control node.

34. The method of claim 32, wherein the page originating entity does not know the internal configuration of the multicell area represented by the area identifier.

35. The method of claim 32, wherein the page originating entity is in a core network.

36. The method of claim 32, wherein the page originating entity is a mobile switching center.

37. The method of claim 32, wherein the paging radio network control node serves as a serving radio network control node which controls a connection through the radio access network with the mobile station, and the another of the plural radio network control nodes saves as a drift radio network control node.

38. The method of claim 37, further comprising:
   the drift radio network control node transmitting to at least portions of plural multicell areas, each of the plural multicell areas being assigned a layer parameter, and
   including in the paging message the layer parameter for the last known multicell area for the mobile station being paged for specifying which layer is to be paged.

39. The method of claim 38, wherein the mobile station identifier is a temporary mobile station identifier (TMSI).

40. The method of claim 37, wherein the serving radio network control node and the drift radio network control node are connected by a physical inter-control node link, and further comprising transmitting the paging message over the physical inter-control node link.

41. The method of claim 37, further comprising:
   receiving a paging response message is received from the mobile station being paged; and then
   initiating, from one of the serving radio network control node and the drift radio network control node, a moveover request to move control of the connection through the radio access network with the mobile station from the serving radio network control node to the drift radio network control node whereby the drift radio network control node becomes the control node newly controlling the connection with the mobile station.

42. The method of claim 41, further comprising sending the moveover request to a core network.

43. The method of claim 42, wherein after the core network moves control of the connection wit the mobile station, the control node newly controlling the connection with the mobile station sending the paging response message to the core network.

44. The method of claim 41, wherein the moveover request message takes the form of the drift radio network control node sending the paging response message to the core network.

45. The method of claim 41, wherein the drift radio network control node initiates a moveover request, and wherein, after moveover of control of the connection with the mobile station, sending, from the control node newly controlling the connection with the mobile station, an advisory message to the radio network control node which formerly served as the serving radio network control node to advise that the mobile station has responded to the paging message.

* * * * *